US007143162B2

United States Patent
Takayama

(10) Patent No.: US 7,143,162 B2
(45) Date of Patent: Nov. 28, 2006

(54) APPARATUS AND METHOD FOR PRESENTING POPULAR DATA IN A NETWORK SYSTEM

(75) Inventor: Masahiro Takayama, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 799 days.

(21) Appl. No.: 10/107,344

(22) Filed: Mar. 28, 2002

(65) Prior Publication Data

US 2002/0143894 A1 Oct. 3, 2002

(30) Foreign Application Priority Data

Mar. 30, 2001 (JP) .............................. 2001-101857

(51) Int. Cl.
    *G06F 15/16* (2006.01)
(52) U.S. Cl. ...................................... 709/224; 709/217
(58) Field of Classification Search ........ 709/201–203, 709/217–227; 345/581, 619, 440.1
    See application file for complete search history.

(56) References Cited

U.S. PATENT DOCUMENTS

| 5,841,979 | A | 11/1998 | Schulhof et al. ....... 395/200.67 |
| 6,317,722 | B1 * | 11/2001 | Jacobi et al. ................. 705/14 |
| 6,466,918 | B1 * | 10/2002 | Spiegel et al. ................ 705/27 |
| 2002/0075302 | A1 * | 6/2002 | Simchik ...................... 345/745 |
| 2005/0102202 | A1 * | 5/2005 | Linden et al. ................ 705/27 |

FOREIGN PATENT DOCUMENTS

| JP | 11-296587 | 10/1999 |
| JP | 2000-3394 | 1/2000 |
| JP | 3069846 | 4/2000 |
| JP | 2000-293423 | 10/2000 |
| JP | 2001-52009 | 2/2001 |

OTHER PUBLICATIONS

Shibaaki, Functions Required for EC or B to B (Sales side) and Key to Successful Management, Illustrated IBM e-business for Survival of IT Age for Middle and Small Companies, Japan, Forest Publishing Co., Ltd., Sep. 25, 2000, First Edition, pp. 84-85.
Toshihiko Sugii, Information Sharing System for WWW Recommended Home Page, Research Report of Information Processing Society, Japan, The Information Processing Society, Jan. 29, 1998, vol. 98, No. 8, pp. 103-108.

(Continued)

*Primary Examiner*—Moustafa M. Meky
(74) *Attorney, Agent, or Firm*—Finnegan, Henderson, Farabow, Garrett & Dunner, L.L.P.

(57) ABSTRACT

When a content providing control section has received a download request for content, the control section tells this fact to a download number-of-times counting section. The download number-of-times counting section, which has been informed of the fact, counts up the number of times of download, which is stored on an individual content table in a download number-of-times counting table. In addition, a home page management section acquires the number of times of download, which is stored on the individual content table in the download number-of-times counting table. The home page management section successively assigns areas of the home page to contents such that a largest area is assigned to a content with a largest number of times of download. The home page management section updates and manages home page data according to this assignment.

2 Claims, 4 Drawing Sheets

OTHER PUBLICATIONS

Toshihiko Sugii, "The information sharing system for recommended homepages on World Wide Web," Information Processing Society, Japan, Incorporated Body of Information Processing Society, Jan. 29, 1998, vol. 98, issue 8, pp. 103-108.

* cited by examiner

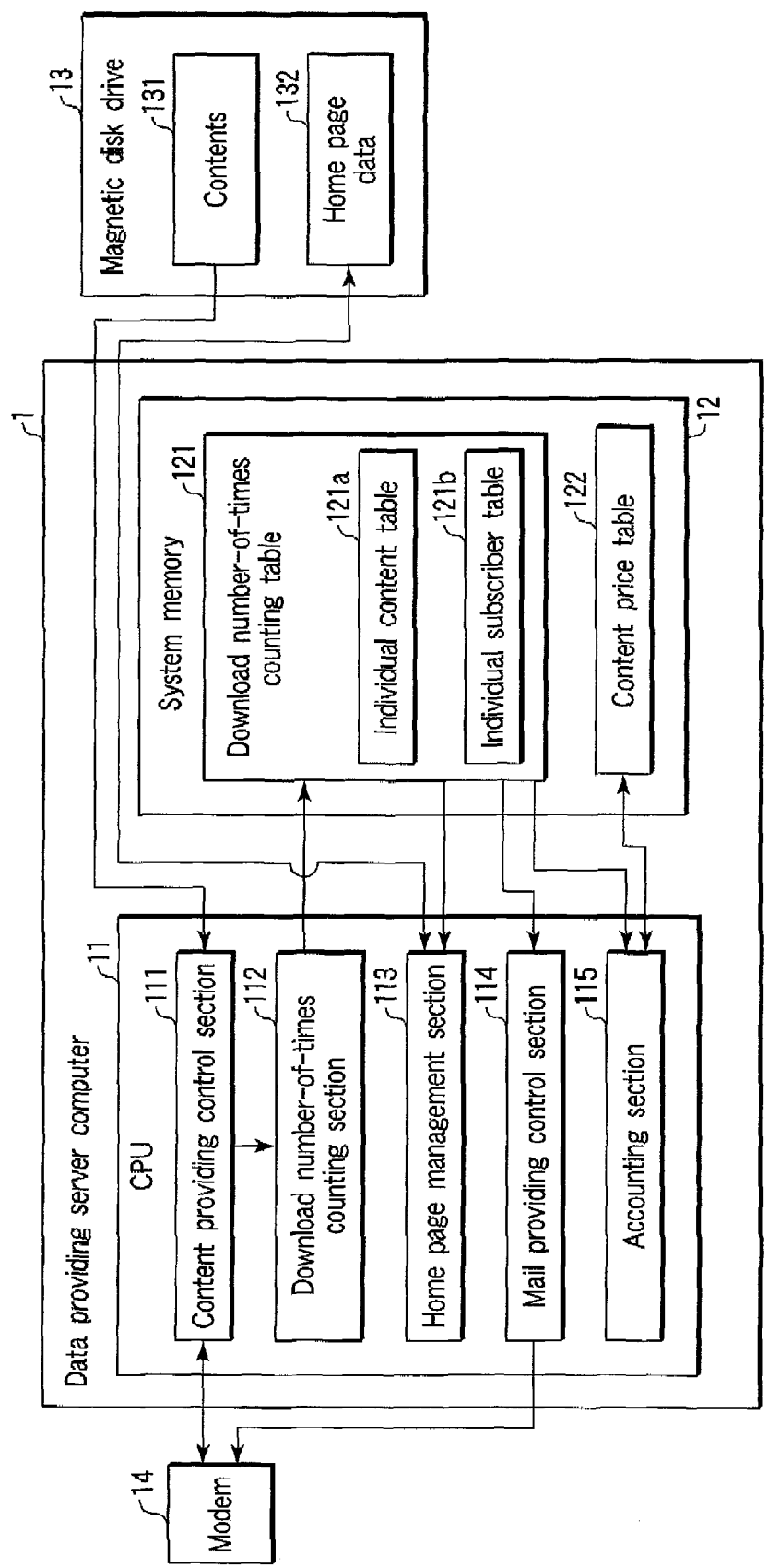
F I G. 2

APPARATUS AND METHOD FOR PRESENTING POPULAR DATA IN A NETWORK SYSTEM

CROSS-REFERENCE TO RELATED APPLICATIONS

This application is based upon and claims the benefit of priority from the prior Japanese Patent Application No. 2001-101857, filed Mar. 30, 2001, the entire contents of which are incorporated herein by reference.

BACKGROUND OF THE INVENTION

1. Field of the Invention

The present invention relates to a data providing apparatus and a data providing method for providing content such as music data to subscribers via a network such as the Internet. More particularly, the invention relates to a data providing apparatus and a data providing method capable of effectively discriminating handling of data and contents of offered services in accordance with the state of download of content.

2. Description of the Related Art

With recent remarkable development of data communication technologies and prevalence of personal computers, various business using the Internet have been devised. A typical business is a content providing service that provides content such as music data in response to a request from the user.

In the content providing service, a server computer, which holds content such as music data, posts the content on a so-called home page, thus making it published on the network. When the user of a client computer, who accesses the home page via the network, has instructed provision of desired content on the home page, the server computer transmits the content to the client computer according to the instruction. On the other hand, the client computer, from which the provision of the desired content has been instructed, receives the content that has been transmitted according to the instruction. The received content is stored in a storage medium such as a memory card or a magnetic disk. The acquisition of the content by the client computer is called, for example, "download."

The client computer is equipped with software for using (e.g. reproducing) the content downloaded in the storage medium such as a memory card or a magnetic disk. Thus, the user can acquire desired content via the network at any time, and use the acquired content many times.

When a plurality of contents are posted on a home page, how to arrange the contents on the home page is very important for a content provider. The reason is that the arrangement of contents influences the number of times of download of contents. More specifically, it is effective to assign a popular content at a conspicuous position with a large space. It is thus desirable to manage the home page such that a content with a large number of times of download is posted under such conditions.

In the prior art, however, the manager of a home page manually determines and manages the arrangement of contents on the home page on the basis of a result of a market research, etc. There is no practice of automatically managing the arrangement of contents on the home page on the basis of the number of times of content download.

Nor is there any practice of determining the content of an additional service provided to the user or determining the price of content, on the basis of the number of times of content download.

BRIEF SUMMARY OF THE INVENTION

The present invention has been made in consideration of the above circumstances, and the object of the invention is to provide a data providing apparatus and a data providing method capable of effectively discriminating handling of data and contents of offered services in accordance with the state of download of content.

In order to achieve the object, this invention may provide a data providing apparatus which provides data to a plurality of information processing apparatuses via a network, the data providing apparatus comprising: a data storage device to store a plurality of data elements to be sent to the information processing apparatuses; a view screen publishing device configured to post the data elements stored in the data storage device and to publish on the network a view screen for accepting a request for provision of the data elements; a counting device configured to count the number of requests for provision of each data element, which have been accepted on the view screen published by the view screen publishing device; and a view screen managing device configured to manage arrangement of the data elements on the view screen published by the view screen publishing device, on the basis of the number of requests counted by the counting device.

The data providing apparatus of the invention can automatically and appropriately manage the arrangement of contents on the home page, based on the number of times of download of content.

The present invention may also provide a data providing apparatus which provides data to a plurality of information processing apparatuses via a network, the data providing apparatus comprising: a data storage device to store a plurality of data elements to be sent to the information processing apparatuses; a data transmission device configured to transmit the data elements stored in the data storage device, upon request from the information processing apparatus; a counting device configured to count the number of data elements transmitted by the data transmission device with respect to each data element; and a mail sending device configured to prepare a mail listing data elements in an order beginning with a data element with a largest number counted by the counting device, and sending the mail to the information processing apparatus.

The data providing apparatus of the invention can automatically prepare and send so-called direct mails in which popular contents are listed.

The present invention may also provide a data providing apparatus which provides data to a plurality of information processing apparatuses via a network, the data providing apparatus comprising: a data storage device to store a plurality of data elements to be sent to the information processing apparatuses; a data transmission device configured to transmit the data elements stored in the data storage device, upon request from the information processing apparatus; a counting device configured to count the number of data elements transmitted by the data transmission device with respect to each data element; and a price determining device configured to determine the price of data elements on the basis of the number counted by the counting device.

The data providing apparatus of the invention can flexibly and automatically cope with the price strategies. For example, the price of a content with a large number of times of download is lowered, or raised. Alternatively, the price of a content with a small number of times of download is lowered.

The present invention may also provide a data providing apparatus which provides data to a plurality of information processing apparatuses via a network, the data providing apparatus comprising: a data storage device to store a plurality of data elements to be sent to the information processing apparatuses; a recognition device configured to recognize that an operator of the information processing apparatus connected via the network is a registered subscriber; a data transmission device configured to transmit the data elements stored in the data storage device, upon request from the information processing apparatus, the operator of which has been recognized to be the subscriber by the recognition device; a counting device configured to count the number of data elements transmitted by the data transmission device with respect to each subscriber; and an additional service determining device configured to determine the content of an additional service to be provided to each subscriber, on the basis of the number counted by the counting device.

For example, in a case where mails containing tune lists are periodically sent to subscriber users in the content providing service of providing music data, the data providing apparatus of the invention can effectively and automatically discriminate an additional service to be provided, on the basis of the number of times of download. For instance, sample music data may be additionally provided to a user with a large number of times of download.

The present invention may also provide a data providing apparatus which provides data to a plurality of information processing apparatuses via a network, the data providing apparatus comprising: a data storage device to store a plurality of data elements to be sent to the information processing apparatuses; a recognition device configured to recognize that an operator of the information processing apparatus connected via the network is a registered subscriber; a data transmission device configured to transmit the data elements stored in the data storage device, upon request from the information processing apparatus, the operator of which has been recognized to be the subscriber by the recognition device; a counting device configured to count the number of data elements transmitted by the data transmission device with respect to each subscriber; and a price determining device configured to determine the price of data elements to be provided for each subscriber, on the basis of the number counted by the counting device.

The data providing apparatus of the invention can effectively and automatically discriminate the price of content on the basis of the number of times of download. For example, the price of content is lowered for a user with a large number of times of download.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a functional block diagram of a data providing server computer according to the embodiment;

DETAILED DESCRIPTION OF THE INVENTION

An embodiment of the present invention will now be described with reference to the accompanying drawings.

Figure 1:
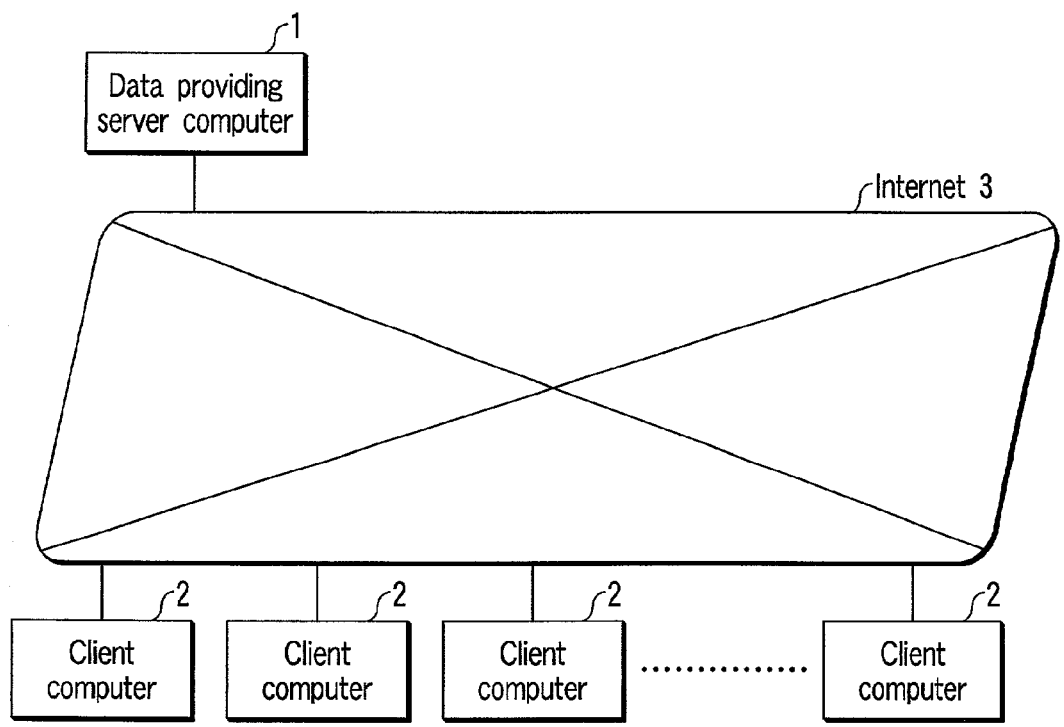
FIG. 1 shows the structure of a data providing system according to an embodiment of the present invention.

FIG. 1 shows the structure of a data providing system according to an embodiment of the present invention.

As is shown in FIG. 1, the data providing system comprises a data providing server computer 1 and client computers 2, which are connected via the Internet 3.

The data providing server computer 1 stores a great number of contents such as music data. The server computer 1 posts the contents on home pages and makes them public on the client computers 2 via the Internet 3. When provision of contents on the home pages has been instructed, the server computer 1 provides the contents to the client computers 2.

On the other hand, the client computer 2 accesses the posted home page of the server computer 1 via the Internet 3 and instructs provision of desired content on the home page. The client computer 2 receives the content that has been transmitted according to the instruction, and stores the received content in a storage medium such as a memory card or a magnetic disk. The acquisition of the content by the client computer 2 is called "download of content."

The data providing system is characterized in that the data providing server computer 1 effectively discriminates handling of each content and the content of additional services in accordance with the number of times of content download. This feature of the invention will now be described in detail.

FIG. 2 is a functional block diagram of the data providing server computer 1. As is shown in FIG. 2, the server computer 1 comprises a CPU 11 and a system memory 12. A magnetic disk drive 13 and a modem 14 are connected to the server computer 1.

The CPU 11 controls the entirety of the server computer 1. The CPU 11 comprises a content providing control section 111, a download number-of-times counting section 112, a home page management section 113, a mail providing control section 114 and an accounting process section 115, as will be described later. These sections are constituted by programs in which operational procedures of the CPU 11 are described.

The system memory 12 is a memory device serving as a main memory of the server computer 1. The memory system 12 is used to store a download number-of-times counting table 121 and a content price table 122 for managing prices of contents.

The magnetic disk drive 13 is a memory device serving as an external storage of the server computer 1. The magnetic disk drive 13 is used to store contents 131 to be sent to the client computers 2, and home page data 132, such as HTML (HyperText Markup Language) files or image data, which constitute home pages to be published on the Internet to post the contents 131.

The model 14 controls data transmission between the server computer 1 and client computers 2 via the Internet 3 according to a prescribed protocol.

Figure 3:
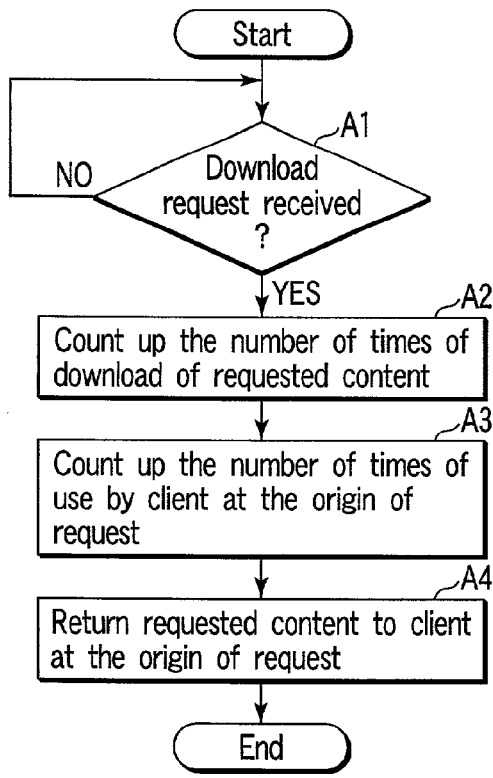
FIG. 3 is a flow chart illustrating an operational procedure at a time when the data providing server computer of the embodiment has been requested by a client computer to download content.

Referring to FIG. 3, a description will be given of an operational procedure at a time when the data providing server computer 1 has been requested by the client computer 2 to download content 131.

If the content providing control section 111 has received a download request for content 131 from the client computer 2 (step A1), the control section 111 tells this fact to the download number-of-times counting section 112. On the other hand, the download number-of-times counting section 112, which has been informed of the reception of the download request, counts up the number of times of download of the requested content 131, which is stored on an individual content table 121a in the download number-of-times counting table 121 (step A2). In addition, the download number-of-times counting section 112 counts up the number of times of download by the subscriber, who is the origin of the request, which is stored on an individual subscriber table 121b in the download number-of-times counting table 121 (step A3).

The content providing control section 111 reads out the requested content 131 from the magnetic disk drive 13 and returns it to the client computer 2 used by the subscriber at the origin of the request (step A4).

Figure 4:
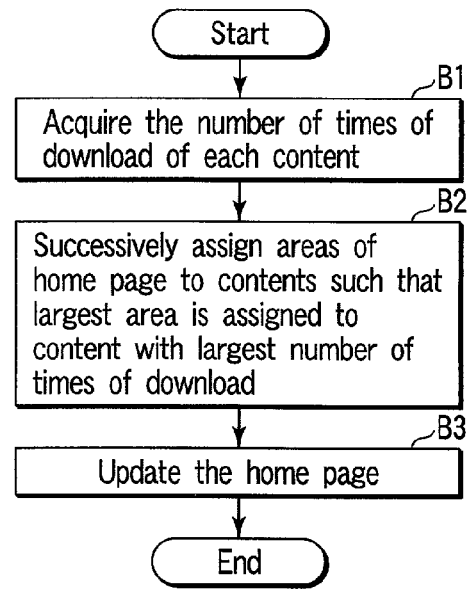
FIG. 4 is a flow chart illustrating an operational procedure at a time when the data providing server computer of the embodiment manages a home page on the basis of the number of times of download.

Referring to FIG. 4, a description will be given of an operational procedure at a time when the data providing server computer 1 manages a home page on the basis of the number of times of download.

The home page management section 113, which is activated, e.g. in a periodic manner, acquires the number of times of download of individual content, which is stored on the individual content table 121a in the download number-of-times counting table 121 (step B1).

The home page management section 113 successively assigns areas of the home page to contents 131 such that a largest area is assigned to a content 131 with a largest number of times of download (step B2). The home page management section 113 updates the home page data 132 according to this assignment (step B3).

Figure 5:
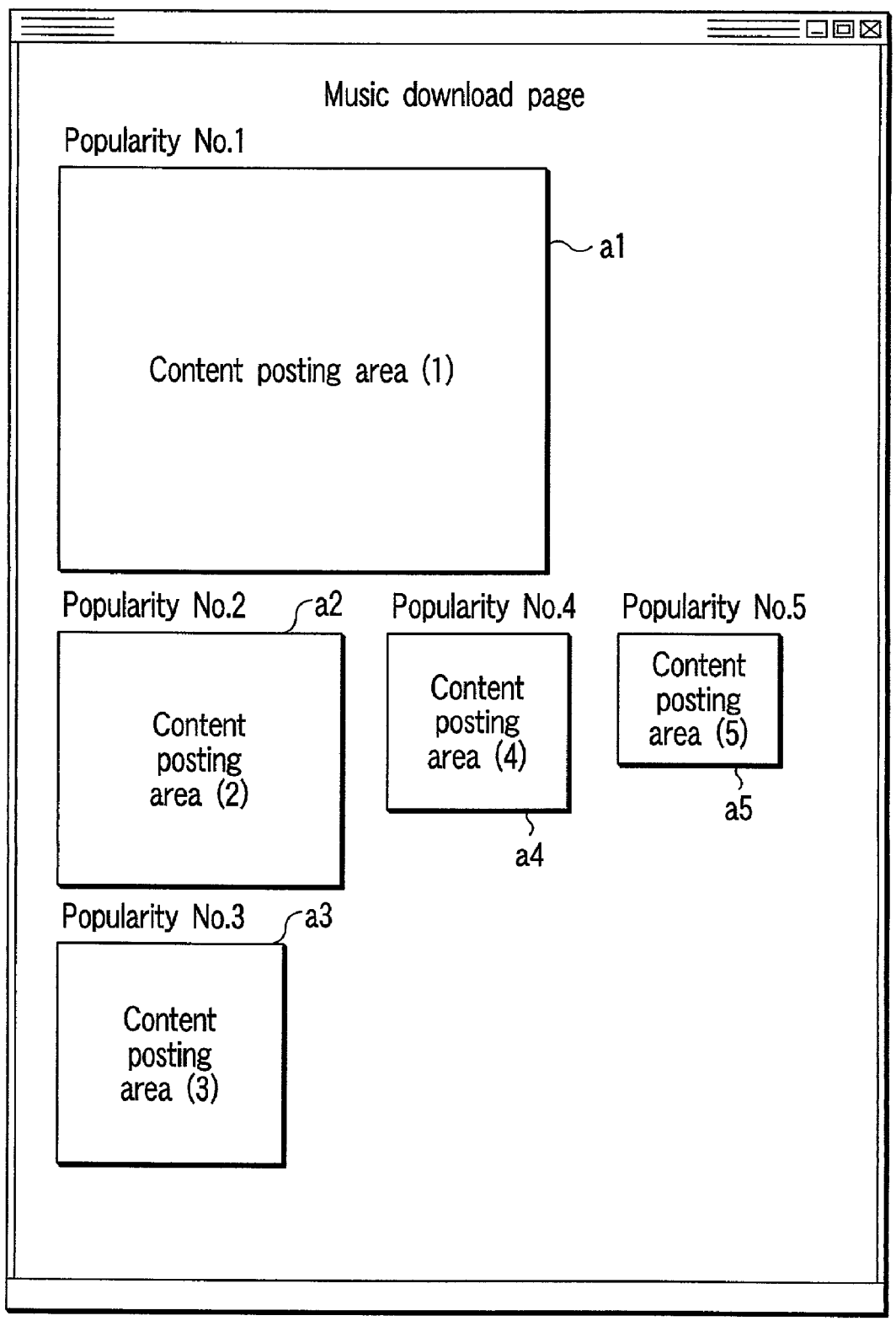
FIG. 5 shows an example of layout of a home page published by the data providing server computer of the embodiment.

Assume that a home page made public with the home page data 132 has a layout as shown in FIG. 5. There are five content posting areas (1)a1 to (5)a5 for posting contents 131, which have sizes decreasing in this order.

The home page management section 113 assigns image data for content 131 with a largest number of times of download, which is stored on the individual content table 121a in the download number-of-times counting table 121, to the content posting area (1)a1. Then, the home page management section 113 assigns image data for content 131 with a second largest number of times of download, which is stored on the individual content table 121a in the download number-of-times counting table 121, to the content posting area (2)a2.

Similarly, the home page management section 113 assigns image data for contents 131 to the content posting areas (3)a3 to (5)a5.

In this manner, based on the number of times of download of content 131, the data providing server computer 1 automatically and appropriately manages the arrangement of contents on the home page.

Figure 6:
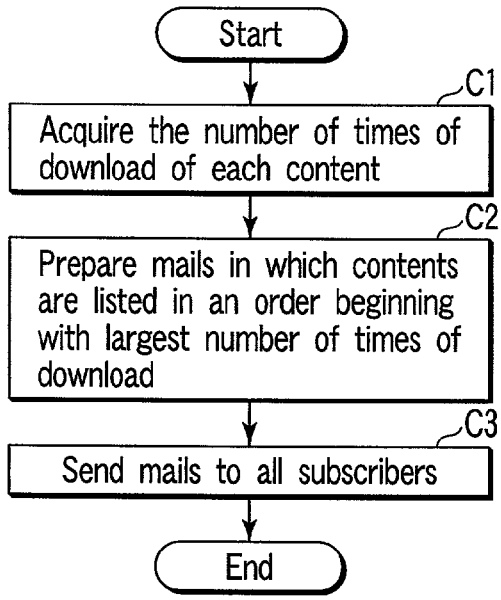
FIG. 6 is a flow chart illustrating an operational procedure at a time when the data providing server computer of the embodiment prepares and sends mails to subscribers on the basis of the number of times of download.

Referring to FIG. 6, a description will be given of an operational procedure at a time when the data providing server computer 1 prepares and sends mails to subscribers on the basis of the number of times of download.

The mail providing control section 114, which is activated, e.g. in a periodic manner, acquires the number of times of download of individual content, which is stored on the individual content table 121a in the download number-of-times counting table 121 (step C1).

The mail providing control section 114 prepares mails in which contents 131 are listed in an order beginning with a largest number of times of download (step C2) and sends them to all subscribers (step C3).

In this manner, the mail providing control section 114 automatically prepares and sends so-called direct mails in which popular contents are listed.

Figure 7:
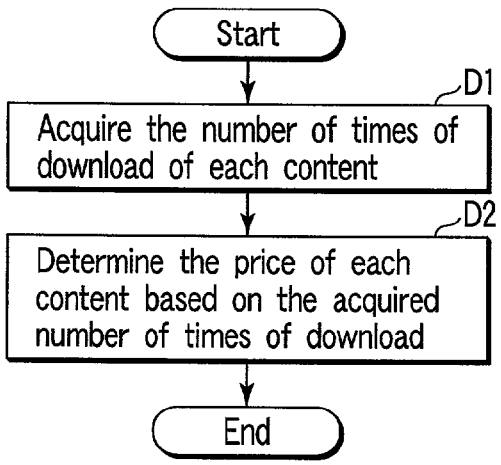
FIG. 7 is a flow chart illustrating an operational procedure at a time when the data providing server computer of the embodiment determines the price of content on the basis of the number of times of download.

Referring to FIG. 7, a description will now be given of an operational procedure at a time when the data providing server computer 1 determines the price of content 131 on the basis of the number of times of download.

The accounting process section 115, which is activated, e.g. in a periodic manner, acquires the number of times of download of individual content, which is stored on the individual content table 121a in the download number-of-times counting table 121 (step D1).

Based on the acquired number of times of download, the accounting process section 115 determines the price of each content 131 and stores the determined price in the content price table 122 (step D2).

In this way, the data providing server computer 1 flexibly and automatically copes with the price strategies. For example, the price of a content with a large number of times of download is lowered, or raised. Alternatively, the price of a content with a small number of times of download is lowered.

Figure 8:
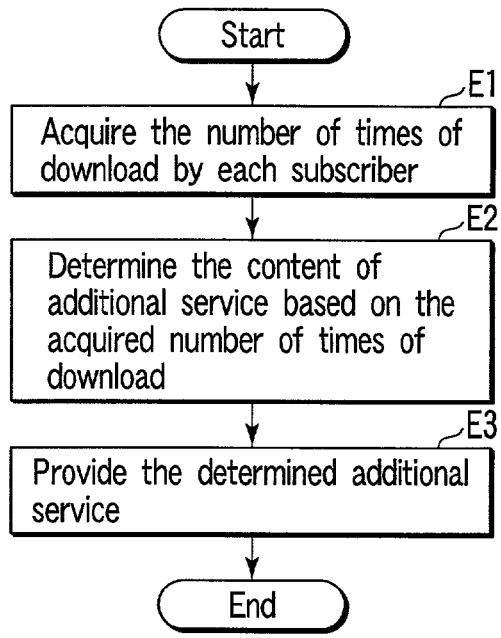
FIG. 8 is a flow chart illustrating an operational procedure at a time when the data providing server computer of the embodiment determines the content of an additional service provided to subscribers on the basis of the number of times of download.

Referring to FIG. 8, a description will be given of an operational procedure at a time when the data providing server computer 1 determines the content of an additional service provided to subscribers on the basis of the number of times of download.

The mail providing control section 114, which is activated, e.g. in a periodic manner, acquires the number of times of download by individual subscribers, which is stored on the individual subscriber table 121b in the download number-of-times counting table 121 (step E1).

Based on the acquired number of times of download, the mail providing control section 114 determines the content of an additional service to be provided to each subscriber (step E2). The mail providing control section 114 executes the provision of the determined additional service (step E3).

For example, in a case where mails containing tune lists are periodically sent to subscriber users in the content providing service of providing music data, the data providing server computer 1 effectively and automatically discriminates an additional service to be provided, on the basis of the number of times of download. For instance, sample music data may be additionally provided to a user with a large number of times of download.

Figure 9:
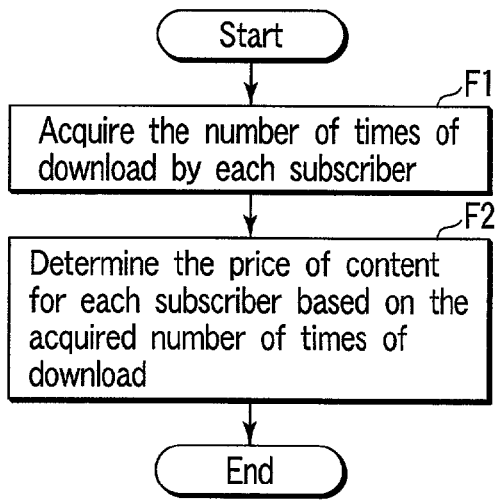
FIG. 9 is a flow chart illustrating an operational procedure at a time when the data providing server computer of the embodiment determines the price of content for individual subscribers on the basis of the number of times of download.

Referring to FIG. 9, a description will be given of an operational procedure at a time when the data providing server computer 1 determines the price of content 131 for individual subscribers on the basis of the number of times of download.

The accounting process section 115, which is activated, e.g. in a periodic manner, acquires the number of times of download by individual subscribers, which is stored on the individual subscriber table 121b in the download number-of-times counting table 121 (step F1).

Based on the acquired number of times of download, the accounting section 115 determines the price of content 131 for each subscriber and stores the determined price in the content price table 122 (step F2).

In this way, the data providing server computer 1 effectively and automatically discriminates the price of content on the basis of the number of times of download. For example, the price of content is lowered for a user with a large number of times of download.

As has been described above, the data providing server computer 1 can effectively discriminate handling of content 131 and the content of offered services in accordance with the state of download of content 131.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A music data providing apparatus which provides a plurality of music data to a plurality of information processing apparatuses via a network, the music data providing apparatus comprising:

a data storage device to store the music data to be sent to said information processing apparatuses;

a view screen publishing device configured to publish on the network a view screen in which a plurality of data posting areas are arbitrarily defined, the view screen being used to post the music data stored in the data storage device and to accept requests to download the music data, the music data being posted in such a manner that a plurality of image data corresponding to the music data are assigned to the data posting areas, respectively;

a counting device configured to count the number of the requests to download the music data, which have been accepted on the view screen published by the view screen publishing device;

a view screen managing device configured to manage assignment of the image data to the data posting areas in the view screen published by the view screen publishing device, on the basis of the number of the requests counted by the counting; and a mail sending device configured to prepare a mail which lists the music data in an order beginning with music data with a largest number counted by the counting device, and to send the mail to the information processing apparatuses.

2. A music data providing method for a music data providing apparatus which provides a plurality of music data to a plurality of information processing apparatuses via a network, the method comprising:

publishing on the network a view screen in which a plurality of data posting areas are arbitrarily defined, the view screen being used to post the music data stored in the data storage device and to accept requests to download the music data, the music data being posted in such a manner that a plurality of image data corresponding to the music data are assigned to the data posting areas, respectively;

counting the number of the requests to download the music data, which have been accepted on the published view screen;

managing assignment of the image data to the data posting areas in the published view screen, on the basis of the counted number of the requests; and preparing a mail which lists the music data in an order beginning with music data with a largest number counted by a counting device, and sending the mail to the information processing apparatuses.

* * * * *